(12) United States Patent
Tian et al.

(10) Patent No.: US 8,903,408 B2
(45) Date of Patent: Dec. 2, 2014

(54) COORDINATED SCHEDULING METHOD AND SYSTEM IN COORDINATED MULTI-POINT TRANSMISSION

(75) Inventors: Kaibo Tian, Shenzhen (CN); Feng Li, Shenzhen (CN); Nan Zhao, Shenzhen (CN); Min Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 263 days.

(21) Appl. No.: 13/516,032

(22) PCT Filed: Dec. 9, 2010

(86) PCT No.: PCT/CN2010/079595
§ 371 (c)(1),
(2), (4) Date: Jun. 14, 2012

(87) PCT Pub. No.: WO2011/072586
PCT Pub. Date: Jun. 23, 2011

(65) Prior Publication Data
US 2012/0252515 A1    Oct. 4, 2012

(30) Foreign Application Priority Data

Dec. 17, 2009  (CN) .......................... 2009 1 0242856

(51) Int. Cl.
H04W 72/00  (2009.01)
H04W 72/12  (2009.01)
H04B 7/02   (2006.01)

(52) U.S. Cl.
CPC ........... *H04W 72/1247* (2013.01); *H04B 7/024* (2013.01)
USPC ........ 455/450; 455/451; 455/452.1; 455/453; 455/454; 455/455; 370/328; 370/329; 370/330

(58) Field of Classification Search
USPC .......................... 455/450–455; 370/328–330
See application file for complete search history.

(56) References Cited

U.S. PATENT DOCUMENTS 8,542,640 B2 *  9/2013  Ramprashad et al. ........ 370/329
2008/0125136 A1 *  5/2008  Song et al. ................. 455/452.1
(Continued)

FOREIGN PATENT DOCUMENTS

CN    101400139 A    4/2009
CN    101442808 A    5/2009
(Continued)

OTHER PUBLICATIONS

International Search Report in international application No. PCT/CN2010/079595, mailed on Mar. 10, 2011.
(Continued)

*Primary Examiner* — Fayyaz Alam
(74) *Attorney, Agent, or Firm* — Oppedahl Patent Law Firm LLC

(57) ABSTRACT

The present disclosure provides a coordinated scheduling method and system in coordinated multi-point transmission. The method includes: a central control cell of a region determines priorities of users to be scheduled in all coordinated cells according to user information from other coordinated cells in the region; the central control cell schedules users in each coordinated cell according to the determined priorities and informs a corresponding coordinated cell of the information on a user that is finally determined to be scheduled; and after receiving the scheduling information from the central control cell, the corresponding coordinated cell schedules a user in corresponding time and frequency resources. The present disclosure ensures performance of a user with the highest priority, further, considering the performance of the whole system, scheduling is performed in a scheduling stage according to a principle that the subsequent users to be scheduled should cause as little interference on the scheduled users as possible, therefore, the interference between scheduled users is effectively reduced, and the capacity of the system is greatly increased.

13 Claims, 1 Drawing Sheet

(56) References Cited

U.S. PATENT DOCUMENTS

| | | | |
|---|---|---|---|
| 2008/0298486 A1 | 12/2008 | Venturino et al. | |
| 2010/0056171 A1* | 3/2010 | Ramprashad et al. | 455/452.1 |
| 2010/0284346 A1* | 11/2010 | Rudrapatna et al. | 370/329 |

FOREIGN PATENT DOCUMENTS

| | | |
|---|---|---|
| CN | 101453438 A | 6/2009 |
| CN | 101478342 A | 7/2009 |
| CN | 101483873 A | 7/2009 |
| WO | 2005081569 A1 | 9/2005 |
| WO | 2010072019 A1 | 7/2010 |

OTHER PUBLICATIONS

English Translation of the Written Opinion of the International Search Authority in international application No. PCT/CN2010/079595, mailed on Mar. 10, 2011.

Don MacVittie, Intro to Load Balancing for Developers—The Algorithms, Mar. 31, 2009, See Supplementary European Search Report.

Mirette Sadek et al., A Leakage-Based Precoding Scheme for Downlink Multi-User MIMO Channels, IEEE Transactions on Wireless Communications, vol. 6, No. 5, May 1, 2007, See Supplementary European Search Report.

Supplementary European Search Report in European application No. 10837023.0, mailed on Sep. 29, 2014.

* cited by examiner

COORDINATED SCHEDULING METHOD AND SYSTEM IN COORDINATED MULTI-POINT TRANSMISSION

TECHNICAL FIELD

The present disclosure relates to a Coordinated Multiple Point (CoMP) transmission and reception technology, and in particular to a coordinated scheduling method and system in CoMP transmission.

BACKGROUND

In order to improve the coverage rate of a high speed data service and increase the average throughput of a cell edge and a cell, a CoMP technology is introduced in a Long Term Evaluation-Advanced (LTE-A) system.

At present, in LTE-A, the CoMP technology is mainly divided into joint transmission technology and coordinated scheduling technology. The joint transmission technology means that, each node in a coordinated transmission set can acquire data information, and Physical Downlink Shared Channel (PDSCH) data is transmitted at the same moment via a plurality of nodes or one node. The coordinated scheduling technology means that, only a serving cell can acquire data information to be transmitted, while user scheduling and the confirmation on a beam forming are carried out through the coordination of a coordinated set. The present disclosure relates to coordinated scheduling in CoMP transmission. No specific coordinated scheduling scheme is provided in the prior art.

SUMMARY

In view of the problem above, the main object of the present disclosure is to provide a coordinated scheduling method and system in CoMP transmission to guarantee the performance of a user with the highest priority.

In order to achieve the purpose above, the technical scheme of the present disclosure is realized as follows:

a coordinated scheduling method in CoMP transmission includes:

a central control cell determined in a region determines priorities of users to be scheduled in all coordinated cells according to user information coming from the all other coordinated cells in the region;

the central control cell schedules a user in each of the coordinated cells according to the determined priorities, and informs a corresponding coordinated cell of information on a user that is finally determined to be scheduled; and after receiving the scheduling information from the central control cell, the corresponding coordinated cell schedules the user in corresponding time and frequency resources.

Before the method is carried out, the following steps may be further included:

a user in each of the coordinated cells in the region independently measures quality of a channel between the user and the coordinated cell where the user is located, and feeds channel measurement information back to the coordinated cell; and each of the coordinated cells sends channel measurement information of a user to be scheduled in the coordinated cell to the central control cell, after receiving the channel measurement information.

The central control cell may be determined in this way:

a coordinated cell in the region is randomly selected as the central control cell at different coordination moments; or the coordinated cells in the region serve in turn as the central control cell at different coordination moments; or a coordinated cell with relatively little traffic in the region is selected as the central control cell at different coordination moments; or once the central control cell is determined, no new central control cell is selected in the following coordination time.

The priorities may be determined in this way: the priorities of users to be scheduled in all coordinated cells in the region are determined according to a proportion fairness principle and current channel qualities of the users.

The information sent by each of the coordinated cells to the central control cell may further include: user-related information of a user to be scheduled in each of the coordinated cells, wherein the user-related information refers to data throughput completed by the user to be scheduled in each of the coordinated cells in a predetermined period of time and a service type of the user; and the priorities are determined in this way:

the higher the channel quality shown by the channel measurement information is, the higher the priority is; the higher the throughput a user transmits in a predetermined period of time, the lower the priority is; and the higher the grade of a service type of a user is, the higher the priority is.

The scheduling a user in each of the coordinated cells according to the determined priorities may include:

the central control cell selects a user with the highest priority and acquires, based on a preset weight criterion, a weight value matched with the user with the highest priority according to channel measurement information of the user with the highest priority;

the central control cell determines a next optimal matched user to be scheduled and a corresponding weight value according to a preset optimal matching criterion;

and the central control cell repeatedly determines a next optimal matched user to be scheduled and a corresponding weight value according to the preset optimal matching criterion until a preset scheduling ending condition is met, and then ends selecting a user to be scheduled.

The weight criterion may be a maximum combination ratio criterion.

The optimal matching criterion may be a maximum signal leakage ratio criterion.

The scheduling ending condition is that all coordinated cells have determined one scheduled user, or that all coordinated cells meet a preset performance threshold.

A coordinated scheduling system in CoMP transmission mainly includes a central control cell and coordinated cells, wherein the central control cell is one of coordinated cells in a region, and is configured to receive user information from the other coordinated cells in the region, determine priorities of users to be scheduled in all the coordinated cells, schedule a user in each of the coordinated cells, and inform a corresponding coordinated cell of information on a user that is finally determined to be scheduled, and each of the coordinated cells is located in the same region with the central control cell, and is configured to receive information about channel quality that is independently measured by a user in the coordinated cell where the user is located and reflects quality of a channel between the user and the coordinated cell, send information on a user to be scheduled in the coordinated cell to the central control cell, receive scheduling information from the central control center, and schedule a user in corresponding time and frequency resources according to the scheduling information.

Specifically, the central control cell schedules a user in each of the coordinated cells in this way:

the central control cell is specifically configured to select a user with the highest priority and acquires, based on a preset weight criterion, a weight value matched with the user with the highest priority according to channel measurement information of the user with the highest priority;

to determine a next optimal matched user to be scheduled and a corresponding weight value according to a preset optimal matching criterion; and to repeatedly determine a next optimal matched user to be scheduled and a corresponding weight value according to the preset optimal matching criterion until a preset scheduling ending condition is met, and then end selecting a user to be scheduled.

The weight criterion may be a maximum combination ratio criterion.

The optimal matching criterion may be a maximum signal leakage ratio criterion.

The scheduling ending condition may be that all the coordinated cells have determined one scheduled user, or that all the coordinated cells meet a preset performance threshold.

It can be seen from the technical scheme according to the present disclosure that, a central control cell of a region determines priorities of users to be scheduled in all coordinated cells in the region according to user information of all the coordinated cells except central control cell itself in the region; the central control cell schedules a user in the each coordinated cell according to the determined priorities and informs a corresponding coordinated cell of information on a user that is finally determined to be scheduled; and after receiving the scheduling information from the central control cell, the corresponding coordinated cell schedules the user in corresponding time and frequency resources. The present disclosure provides a performance guarantee for a user with the highest priority. Further, in the present disclosure, considering the performance of the whole system, scheduling is performed in a scheduling stage according to a principle that a subsequent user to be scheduled should cause as little interference on the scheduled users as possible, therefore, the interference between scheduled users is effectively reduced, and the capacity of the system is greatly increased.

DETAILED DESCRIPTION

Figure 1:
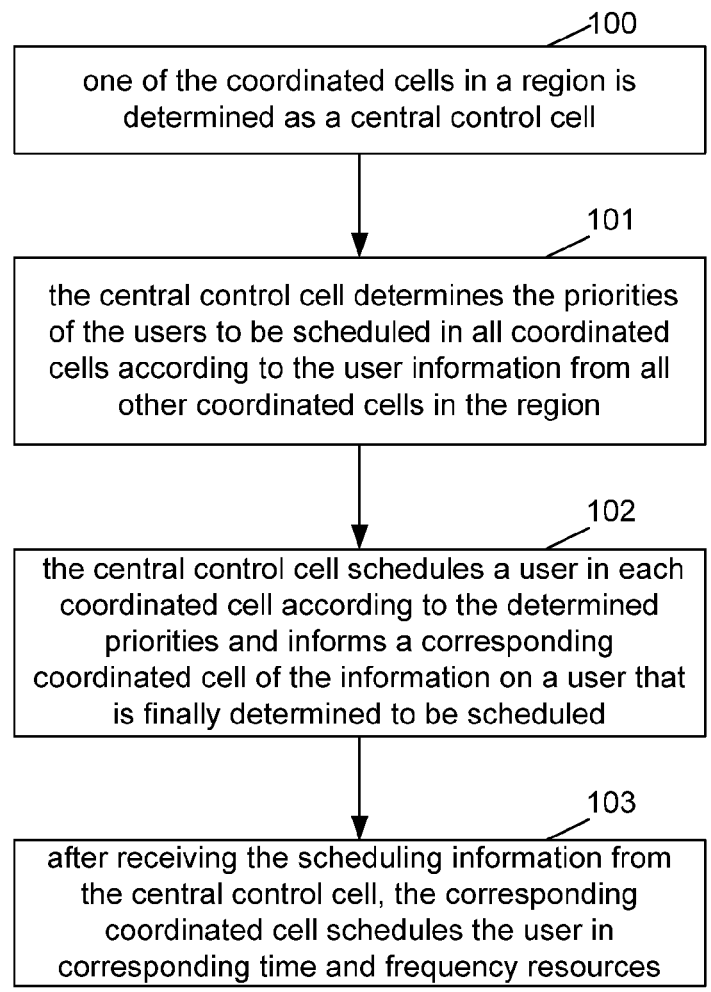
FIG. 1 is a flow chart of a coordinated scheduling method in CoMP transmission according to the present disclosure.

FIG. 1 is a flow chart of a coordinated scheduling method in CoMP transmission, as shown in FIG. 1, the coordinated scheduling method comprises the following steps:

step 100: one of coordinated cells in a region is determined as a central control cell;

in this step, the central control cell is determined in this way:

a coordinated cell in the region is randomly selected as the central control cell at different coordination moments; or all the coordinated cells serve in turn as the central control cell at different coordination moments; or a coordinated cell with little traffic is selected as the central control cell at different coordination moments; or once the central control cell is determined in one of the ways above, no new central control cell is selected in the following coordination time;

step 101: the central control cell determines priorities of users to be scheduled in all the coordinated cells according to user information of all other coordinated cells in the region;

when there are a plurality of coordinated cells in the region, a user in each coordinated cell independently measures the quality of a channel between the user and the coordinated cell where the user is located, and feeds channel measurement information back to the coordinated cell; and after receiving user information from a user in the coordinated cell, the coordinated cell sends information on a user to be scheduled in the coordinated cell to the central control cell;

in this step, the priorities are determined in this way: the priorities of users to be scheduled in all coordinated cells in the region are determined according to a proportion fairness principle and current channel qualities of the users, wherein the proportion fairness principle is a technical means that is frequently used by those skilled in the art and is therefore not repeatedly described here;

the information sent by each coordinated cell to the central control cell further includes: user-related information of a user to be scheduled in the coordinated cell, wherein the user-related information refers to data throughput completed by the user to be scheduled in the coordinated cell in a predetermined period of time and a service type of the user; and specially, the priorities are determined in this way:

the higher the channel quality shown by the channel measurement information is, the higher the priority is; the higher the throughput a user transmits in a predetermined period of time, the lower the priority is; and the higher the grade of the service type of a user is, the higher the priority is;

step 102: the central control cell schedules a user in each coordinated cell according to the determined priorities and informs a corresponding coordinated cell of information on a user that is finally determined to be scheduled;

specifically, this step comprises: after acquiring the priorities of all the users to be scheduled, the central control cell selects a user with the highest priority, and acquires, based on a preset weight criterion, a weight value matched with the user with the highest priority according to corresponding channel measurement information; considering the user having been determined to be scheduled, the central control cell determines a next optimal matched user to be scheduled and a corresponding weight value according to a preset optimal matching criterion, and subsequently, repeatedly determines a next optimal matched user to be scheduled and a corresponding weight value according to the preset optimal matching criterion until a preset scheduling ending condition is met, and then ends the selection on a user to be scheduled;

wherein the weight of the user with the highest priority is acquired in this way: the weight value of the user with the highest priority is determined according to a maximum combination ratio criterion and other criterions which are taken as the weight criterion, wherein the maximum combination ratio criterion is a technical means that is frequently used by those skilled in the art and is therefore not repeatedly described here;

the optimal matched user is selected in this way: the optimal matched user is acquired according to a maximum signal leakage ratio criterion and so on which are taken as the optimal matching criterion, wherein the maximum signal leakage ratio criterion is a technical means that is frequently used by those skilled in the art and is therefore not repeatedly described here;

the scheduling ending condition may be that all the coordinated cells have determined one scheduled user; or that all the coordinated cells meet a preset performance threshold;

and step 103: after receiving the scheduling information from the central control cell, the corresponding coordinated cell schedules the user in corresponding time and frequency resources; this step can be realized using an existing technology that is not repeatedly described here.

The scheme provided herein guarantees the performance of a user with the highest priority. Further, in the present disclosure, considering the performance of the whole system, a scheduling is performed in a scheduling stage according to a principle that a subsequent user to be scheduled should cause as little interference on a user having been determined to be scheduled as possible, therefore, the interference between scheduled users is effectively reduced, and the capacity of the system is greatly increased.

Figure 2:
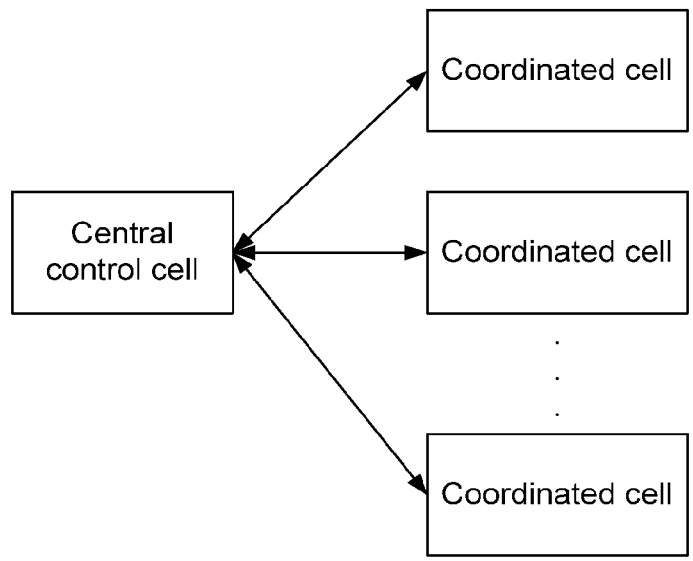
FIG. 2 is a schematic diagram illustrating the structure of a coordinated scheduling system in CoMP transmission according to the present disclosure.

The present disclosure further provides a system for the method disclosed herein, FIG. 2 is a schematic diagram illustrating the structure of a coordinated scheduling system in CoMP transmission according to the present disclosure, as shown in FIG. 2, the coordinated scheduling system provided herein mainly comprises a central control cell and coordinated cells, wherein the central control cell is one of coordinated cells in a region that is configured to receive user information from other coordinated cells in the region, determine priorities of users to be scheduled in all the coordinated cells, schedule a user in each coordinated cell according to the determined priorities, and inform a corresponding coordinated cell of information on a user that is finally determined to be scheduled;

and each of the coordinated cells is located in the same region with the central control cell, and is configured to receive information about channel quality that is independently measured by a user in the coordinated cell where the user is located and reflects the quality of a channel between the user and the coordinated cell, send information on a user to be scheduled in the coordinated cell to the central control cell, receive scheduling information from the central control center, and schedule a user in corresponding time and frequency resources according to the scheduling information. Here, the coordinated cells include the central control cell.

The present disclosure is described below in detail with reference to specific embodiments.

Embodiment 1 assuming that in a region, there are three coordinated cells, which are referred to as a coordinated cell A, a coordinated cell B and a coordinated cell C; there are three users to be scheduled in coordination resources of each coordinated cell: users to be scheduled in the coordinated cell A being users $a1$, $a2$ and $a3$, users to be scheduled in the coordinated cell B being users $b1$, $b2$ and $b3$, and users to be scheduled in the coordinated cell C being users $c1$, $c2$ and $c3$; a scheduling ending condition is that a scheduling selection process can be ended if all coordinated cells have determined one scheduled user; a central control cell is selected in this way: a coordinated cell with relatively little traffic is selected from the coordinated cells as a central control cell at different coordination moments; and the coordinated cell C adopts an MU-MIMO mode.

First, each of the users $a1$, $a2$ and $a3$ to be scheduled in the coordinated cell A independently measures the quality of a channel between a base station of the coordinated cell A and itself, and feeds channel measurement information back to the coordinated cell A; each of the users $b1$, $b2$ and $b3$ to be scheduled in the coordinated cell B independently measures the quality of a channel between a base station of the coordinated cell B and itself, and feeds channel measurement information back to the coordinated cell B; and each of the users $c1$, $c2$ and $c3$ to be scheduled in the coordinated cell C independently measures the quality of a channel between a base station of the coordinated cell C and itself, and feeds channel measurement information back to the coordinated cell C.

Provided that a statistical result shows that the coordinated cell C has the least traffic, then, the coordinated cell C is selected as the central control cell in this embodiment. The coordinated cell A sends the central control cell C the channel measurement information of the three users to be scheduled in the coordinated cell A and user-related information such as the data throughput completed by the three users in a given period of time; and similarly, the coordinated cell B sends the central control cell C the channel measurement information of the three users to be scheduled in the coordinated cell B and user-related information such as data throughput completed by the three users in a given period of time. At this moment, the nine users to be scheduled can be deemed as nine users to be scheduled in a big virtual cell.

Then, the central control cell C sorts the priorities of the nine users to be scheduled; assuming that the priorities are sorted according to current channel information and history information of the users, for example: the better the current channel quality of a user is, the higher the priority of the user is; and the higher the throughput a user transmits in a given period of time, the lower the priority of the user is. Assuming the user $b2$ is selected as the user with the highest priority.

The central control cell C acquires an optimal weight value used by the user $b2$ according to the channel measurement information of the user $b2$, and determines the second scheduled user from the rest eight users to the scheduled according to the maximum signal leakage ratio criterion, that is, the second scheduled user should be the one causing least interference on the user $b2$; assuming that based on a comparison, the user $c1$ is selected as the second scheduled user and a corresponding weight vector used by the user $c1$ is acquired.

The central control cell C determines the third scheduled user from the rest seven users to be scheduled according to the maximum signal leakage ratio criterion, that is, the third user should be the one causing least interference on users $b2$ and $c1$; assuming that based on a comparison, the user $c2$ is selected as the third scheduled user, and a corresponding weight vector used by the user $c2$ is acquired.

The central control cell C determines the fourth scheduled user from the rest six users to be scheduled according to the maximum signal leakage ratio criterion, that is, the fourth user should be the one causing least interference on users $b2$, $c1$ and $c2$; assuming that based on a comparison, the user $a1$ is selected as the fourth scheduled user, and a corresponding weight vector used by the user $a1$ is acquired.

At this moment, all coordinated cells have one scheduled user, that is, the scheduling ending condition is met, therefore, the current scheduling process is ended.

Then, the central control cell C sends the results of the scheduling to the coordinated cells A and B, and at last, the three coordinated cells perform corresponding scheduling in the coordination resources according to the results of the scheduling.

Embodiment 2 assuming that in a region, there are three coordinated cells, which are referred to as a coordinated cell A, a coordinated cell B and a coordinated cell C; there are three users to be scheduled in coordination resources of each coordinated cell: users to be scheduled in the coordinated cell A being users a1, a2 and a3, users to be scheduled in the coordinated cell B being users b1, b2 and b3, and users to be scheduled in the coordinated cell C being users c1, c2 and c3; assuming that the scheduling ending condition is that: a maximum signal leakage ratio threshold is preset, a next user to be scheduled is determined according to a maximum signal leakage ratio criterion, the current scheduling selection process is ended when the maximum signal leakage ratio of each of all the rest users to be scheduled is greater than the maximum signal leakage ratio threshold.

Each of the users a1, a2 and a3 to be scheduled in the coordinated cell A independently measures the quality of a channel between a base station of the coordinated cell A and itself, and feeds channel measurement information back to the coordinated cell A; each of the users b1, b2 and b3 to be scheduled in the coordinated cell B independently measures the quality of a channel between a base station of the coordinated cell B and itself, and feeds channel measurement information back to the coordinated cell B; and each of the users c1, c2 and c3 to be scheduled in the coordinated cell C independently measures the quality of a channel between a base station of the coordinated cell C and itself, and feeds channel measurement information back to the coordinated cell C; a central control cell is selected in this way: a coordinated cell is randomly selected as the central control cell.

First, assuming that the coordinated cell C is randomly selected as the central control cell, the coordinated cell A sends the central control cell C the channel measurement information of the three users to be scheduled in the coordinated cell A, information about data throughput completed by the three users in a given period of time and other information; and similarly, the coordinated cell B sends the central control cell C the channel measurement information of the three users to be scheduled in the coordinated cell B, information about data throughput completed by the three users in a given period of time and other information. At this moment, the nine users to be scheduled can be deemed as nine users to be scheduled in a big virtual cell.

Then, the central control cell C sorts the priorities of the nine users to be scheduled; assuming that the priorities are sorted according to current channel information and history information of the users: the better the current channel quality of a user is, the higher the priority of the user is; the higher the throughput a user transmits in a given period of time, the lower the priority of the user is. Assuming the user b2 is selected as the user with the highest priority.

The central control cell C acquires an optimal weight value used by the user b2 according to the channel measurement information of the user b2, and determines the second scheduled user from the rest eight users to the scheduled according to the maximum signal leakage ratio criterion, that is, the second scheduled user should be the one causing least interference on the user b2; assuming that based on a comparison, the user c1 is selected as the second scheduled user, a corresponding weight vector used by the user c1 is acquired, and the maximum signal leakage ratio of the user c1 is higher than the preset threshold.

The central control cell C continues determining, among the rest users to be scheduled, whether or not to schedule a user to be scheduled according to the maximum signal leakage ratio criterion, in this case, the signal leakage ratios of all users having been determined to be scheduled are considered during a signal leakage ratio calculation. If the maximum signal leakage ratios of all the rest users to be scheduled are all lower than the preset threshold, then the scheduling process is ended.

Then, the central control cell C sends results of the scheduling to the coordinated cells A and B, and at last, the three coordinated cells perform corresponding scheduling in the coordination resources according to the results of the scheduling.

In embodiment 2, in order to guarantee the performance of the whole system, only the coordinated cell B and the coordinated cell C schedule users synchronously, that is, not each coordinated cell can schedule users.

The mentioned above is only preferred embodiments of the present disclosure but not limitation for the protection scope of the present disclosure, various modifications and variations can be devised by those skilled in this art, and it should be understood that any modification, equivalent and improvement devised without departing from the spirit and scope of the present disclosure belong to the protection scope of the present disclosure.

The invention claimed is:

1. A coordinated scheduling method in Coordinated Multiple Point transmission, comprising:
   determining, by a central control cell determined in a region, priorities of users to be scheduled in all coordinated cells according to user information coming from the all other coordinated cells in the region;
   scheduling, by the central control cell, a user in each of the coordinated cells according to the determined priorities, and informing by the central control cell a corresponding coordinated cell of information on a user that is finally determined to be scheduled; and
   scheduling, by the corresponding coordinated cell, the user in corresponding time and frequency resources, after receiving the scheduling information from the central control cell;
   wherein the central control cell is determined in this way:
   a coordinated cell in the region is randomly selected as the central control cell at different coordination moments; or
   the coordinated cells in the region serve in turn as the central control cell at different coordination moments; or
   a coordinated cell with relatively little traffic in the region is selected as the central control cell at different coordination moments; or
   once the central control cell is determined, no new central control cell is selected in following coordination time;
   wherein the scheduling a user in each of the coordinated cells according to the determined priorities comprises:
   the central control cell selects a user with the highest priority and acquires, based on a preset weight criterion, a weight value matched with the user with the highest priority according to channel measurement information of the user with the highest priority;
   the central control cell determines a next optimal matched user to be scheduled and a corresponding weight value according to a preset optimal matching criterion;
   and the central control cell repeatedly determines a next optimal matched user to be scheduled and a corresponding weight value according to the preset optimal matching criterion until a preset scheduling ending condition is met, and then ends selecting a user to be scheduled.

2. The coordinated scheduling method according to claim 1, further comprising: before the method is carried out,
   independently measuring, by a user in each of the coordinated cells in the region, quality of a channel between the user and the coordinated cell where the user is located, and feeding channel measurement information back by the user to the coordinated cell; and sending, by each of the coordinated cells, channel measurement information of a user to be scheduled in the coordinated cell to the central control cell, after each of the coordinated cells receives the channel measurement information.

3. The coordinated scheduling method according to claim 1, wherein the priorities are determined in this way: the priorities of users to be scheduled in all coordinated cells in the region are determined according to a proportion fairness principle and current channel qualities of the users.

4. The coordinated scheduling method according to claim 3, wherein the information sent by each of the coordinated cells to the central control cell further comprises: user-related information of a user to be scheduled in each of the coordinated cells, wherein the user-related information refers to data throughput completed by the user to be scheduled in each of the coordinated cells in a predetermined period of time and a service type of the user; and the priorities are determined in this way:

the higher channel quality shown by the channel measurement information is, the higher a priority is; the higher throughput a user transmits in a predetermined period of time, the lower a priority is; and the higher a grade of a service type of a user is, the higher a priority is.

5. The coordinated scheduling method according to claim 1, wherein the weight criterion is a maximum combination ratio criterion.

6. The coordinated scheduling method according to claim 1, wherein the optimal matching criterion is a maximum signal leakage ratio criterion.

7. The coordinated scheduling method according to claim 1, wherein the scheduling ending condition is: all coordinated cells have determined one scheduled user; or all coordinated cells meet a preset performance threshold.

8. A coordinated scheduling system in Coordinated Multiple Point transmission, mainly comprising a central control cell and coordinated cells, wherein the central control cell is one of coordinated cells in a region, and is configured to receive user information from the other coordinated cells in the region, determine priorities of users to be scheduled in all the coordinated cells, schedule a user in each of the coordinated cells, and inform a corresponding coordinated cell of information on a user that is finally determined to be scheduled; and each of the coordinated cells is located in the same region with the central control cell, and is configured to receive information about channel quality that is independently measured by a user in the coordinated cell where the user is located and reflects quality of a channel between the user and the coordinated cell, send information on a user to be scheduled in the coordinated cell to the central control cell, receive scheduling information from the central control cell, and schedule a user in corresponding time and frequency resources according to the scheduling information;

wherein the central control cell is determined in this way:
a coordinated cell in the region is randomly selected as the central control cell at different coordination moments; or the coordinated cells in the region serve in turn as the central control cell at different coordination moments; or a coordinated cell with relatively little traffic in the region is selected as the central control cell at different coordination moments; or once the central control cell is determined, no new central control cell is selected in following coordination time;

wherein specifically, the central control cell schedules a user in each of the coordinated cells in this way:

the central control cell is specifically configured to select a user with the highest priority and acquires, based on a preset weight criterion, a weight value matched with the user with the highest priority according to channel measurement information of the user with the highest priority;

configured to determine a next optimal matched user to be scheduled and a corresponding weight value according to a preset optimal matching criterion; and configured to repeatedly determine a next optimal matched user to be scheduled and a corresponding weight value according to the preset optimal matching criterion until a preset scheduling ending condition is met, and then end selecting a user to be scheduled.

9. The coordinated scheduling system according to claim 8, wherein the weight criterion is a maximum combination ratio criterion.

10. The coordinated scheduling system according to claim 8, wherein the optimal matching criterion is a maximum signal leakage ratio criterion.

11. The coordinated scheduling system according to claim 8, wherein the scheduling ending condition is: all coordinated cells have determined one scheduled user; or all coordinated cells meet a preset performance threshold.

12. The coordinated scheduling method according to claim 2, wherein the priorities are determined in this way: the priorities of users to be scheduled in all coordinated cells in the region are determined according to a proportion fairness principle and current channel qualities of the users.

13. The coordinated scheduling method according to claim 12, wherein the information sent by each of the coordinated cells to the central control cell further comprises: user-related information of a user to be scheduled in each of the coordinated cells, wherein the user-related information refers to data throughput completed by the user to be scheduled in each of the coordinated cells in a predetermined period of time and a service type of the user; and the priorities are determined in this way:

the higher channel quality shown by the channel measurement information is, the higher a priority is; the higher throughput a user transmits in a predetermined period of time, the lower a priority is; and the higher a grade of a service type of a user is, the higher a priority is.

* * * * *